US012688369B2

(12) United States Patent
Ranganathan et al.

(10) Patent No.: US 12,688,369 B2
(45) Date of Patent: Jul. 21, 2026

(54) USING FEATURE AGGREGATION TO DETERMINE INTENT CLASSIFICATIONS FOR TEXT TRANSCRIPTS

(71) Applicant: Verizon Patent and Licensing Inc., Basking Ridge, NJ (US)

(72) Inventors: Prakash Ranganathan, Gingee (IN); Saurabh Tahiliani, Noida (IN); Durgesh Kumar, Bangalore (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 375 days.

(21) Appl. No.: 18/385,229

(22) Filed: Oct. 30, 2023

(65) Prior Publication Data

US 2025/0139371 A1     May 1, 2025

(51) Int. Cl.
*G06F 40/30*        (2020.01)
*G06N 3/045*        (2023.01)

(52) U.S. Cl.
CPC ............. *G06F 40/30* (2020.01); *G06N 3/045* (2023.01)

(58) Field of Classification Search
None
See application file for complete search history.

(56)                References Cited

U.S. PATENT DOCUMENTS 11,847,565  B1 *  12/2023  Hao ........................ G06N 3/045
2020/0151253  A1 *   5/2020  Wohlwend .............. G06F 40/30

* cited by examiner

*Primary Examiner* — Nafiz E Hoque

(57)                ABSTRACT

An illustrative intent classification engine may access a text transcript and determine one or more features associated with the text transcript. Based on the one or more features, the intent classification engine may generate an aggregate embedding vector and provide the aggregate embedding vector as an input to a trained model configured to output an intent classification. Corresponding methods and systems are also disclosed.

20 Claims, 12 Drawing Sheets

700

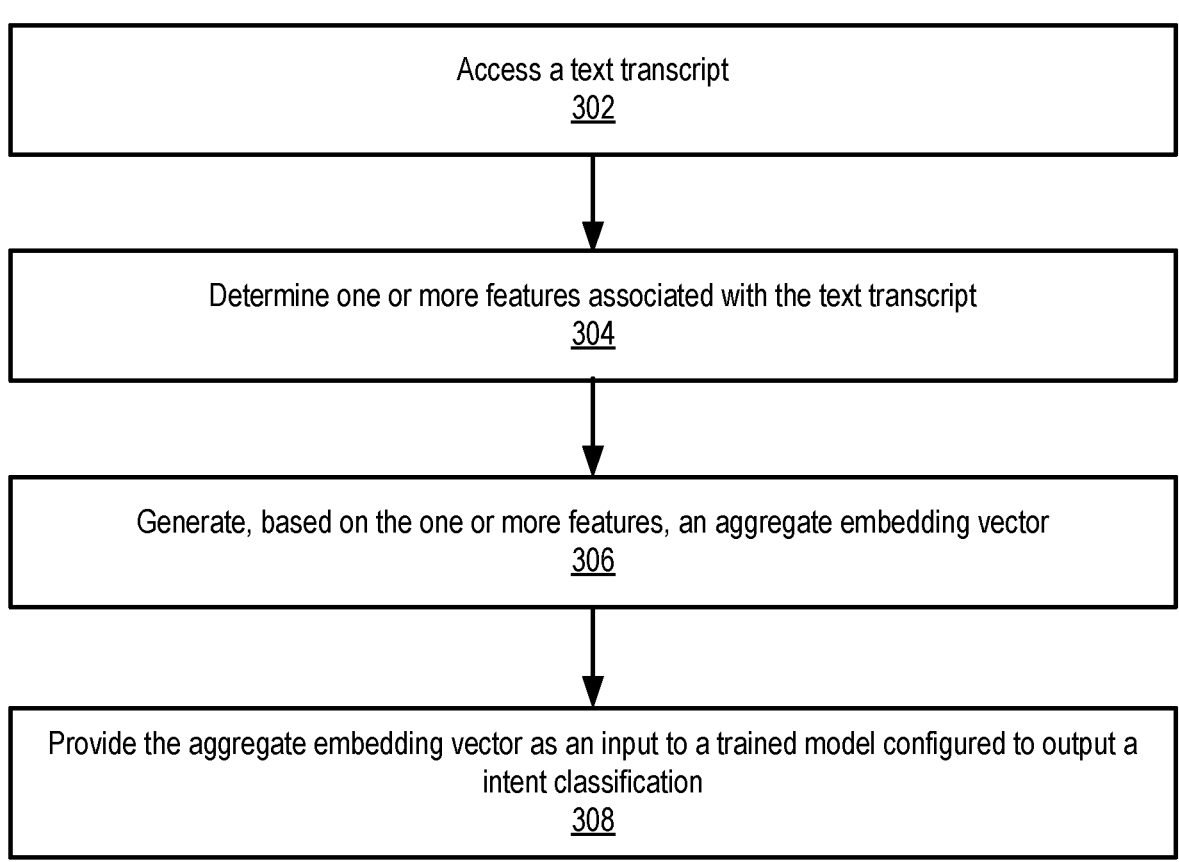
Access a text transcript
302
Determine one or more features associated with the text transcript
304
Generate, based on the one or more features, an aggregate embedding vector
306
Provide the aggregate embedding vector as an input to a trained model configured to output a intent classification
308
Fig. 3

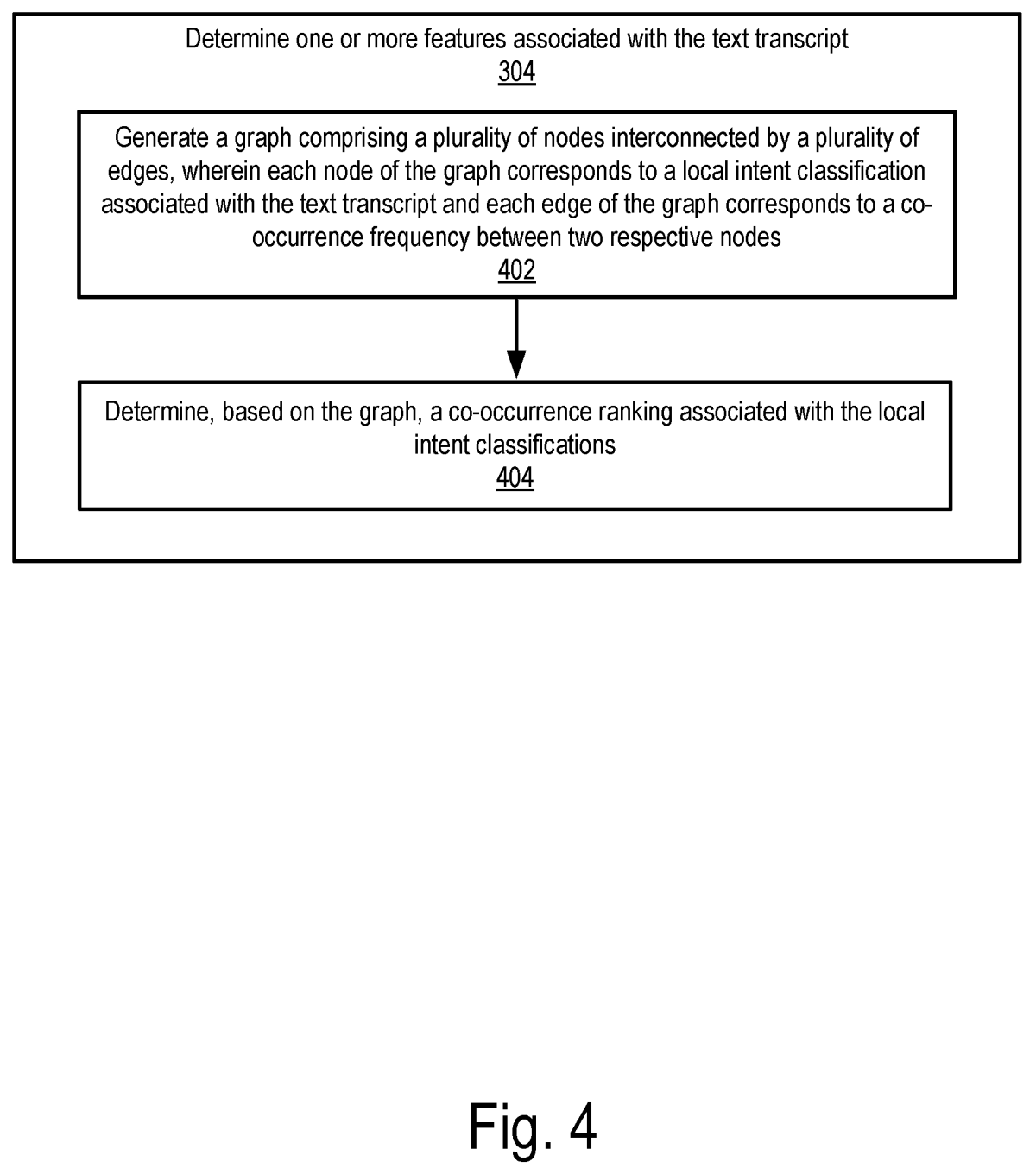

Determine one or more features associated with the text transcript
304

Generate a graph comprising a plurality of nodes interconnected by a plurality of edges, wherein each node of the graph corresponds to a local intent classification associated with the text transcript and each edge of the graph corresponds to a co-occurrence frequency between two respective nodes
402

Determine, based on the graph, a co-occurrence ranking associated with the local intent classifications
404

Fig. 4

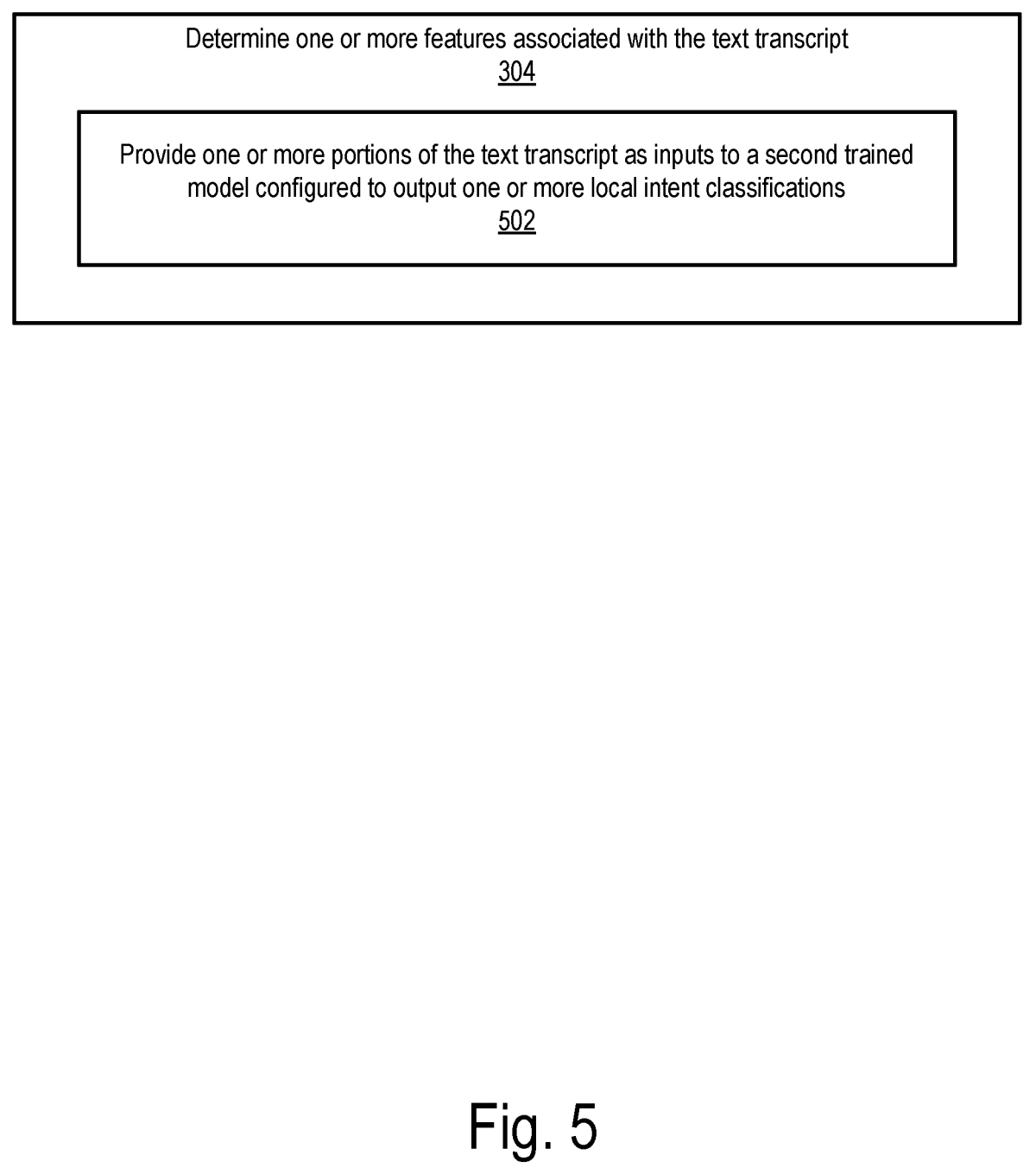

Determine one or more features associated with the text transcript
304

Provide one or more portions of the text transcript as inputs to a second trained model configured to output one or more local intent classifications
502

Fig. 5

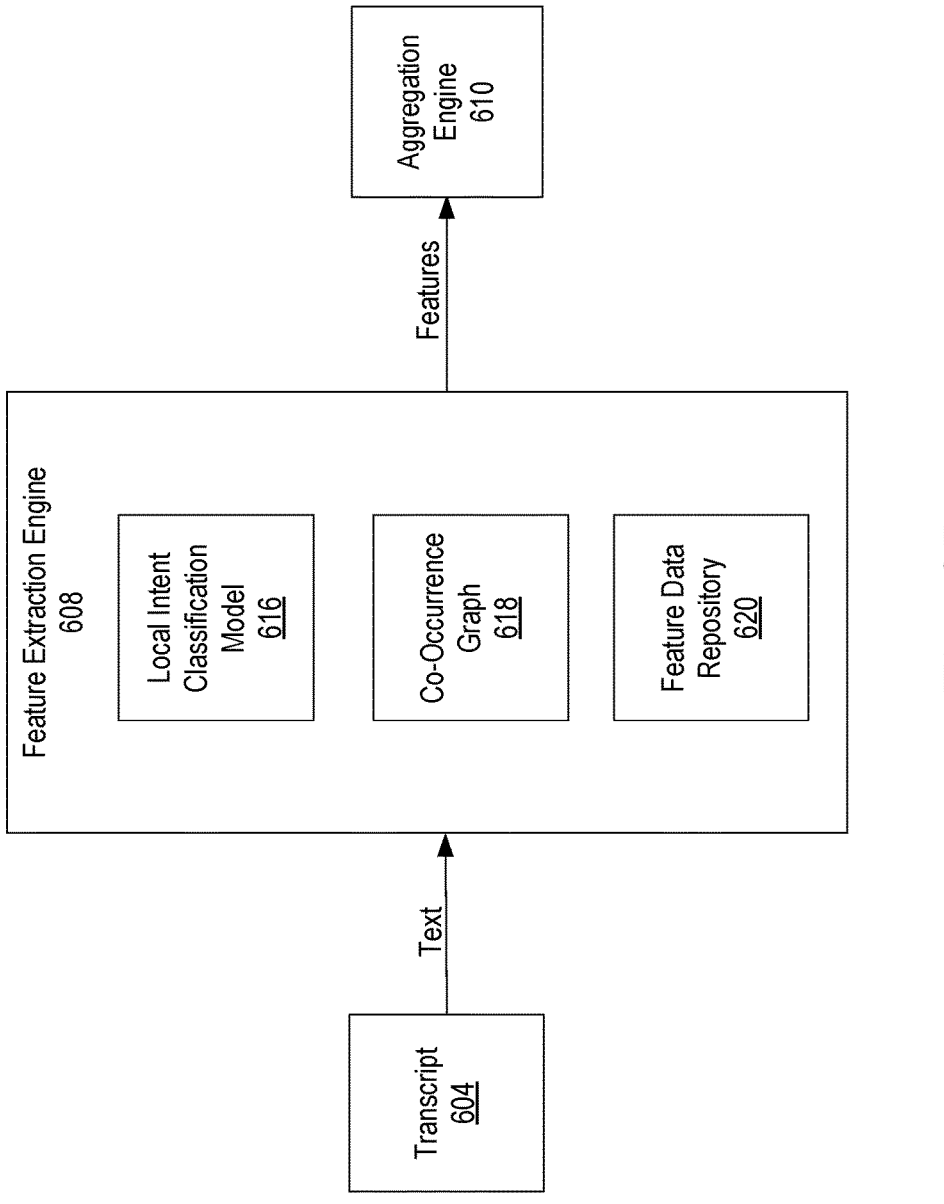
Fig. 6B

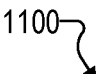
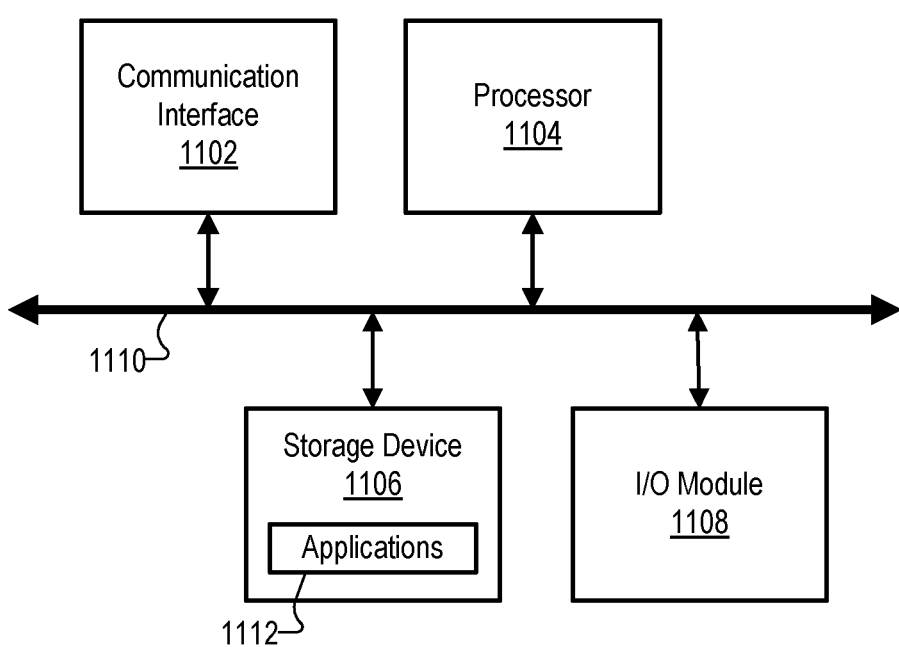
Fig. 11

USING FEATURE AGGREGATION TO DETERMINE INTENT CLASSIFICATIONS FOR TEXT TRANSCRIPTS

BACKGROUND INFORMATION

Various types of businesses, including wireless carriers and other service providers, engage in communications with their customers for a variety of reasons. For example, such communications may be conducted in furtherance of sales transactions (e.g., to sell new devices or services, to offer discounts or promotions on new hardware or plans, etc.), customer support transactions (e.g., technical support to troubleshoot problems with devices or help set up new devices; service support to resolve complaints or answer questions about customer accounts, etc.), and/or other such matters that may call for communication between the customer and a representative of the business. Resolving such communications in an effective and productive manner may be difficult for a variety of reasons. For example, it may be difficult to determine an accurate intent of the customer, particularly in lengthy conversations that may relate to many different purposes and/or topics.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 3-5 show illustrative methods of using feature aggregation to determine intent classifications for text transcripts in accordance with principles described herein.

FIGS. 6A-6B show illustrative aspects of a system configured to use feature aggregation to determine an intent classification for a text transcript in accordance with principles described herein.

FIG. 11 shows an illustrative computing system that may implement an intent classification engine configured to determine intent classifications for text transcripts.

DETAILED DESCRIPTION OF EXAMPLE EMBODIMENTS

Figure 1:
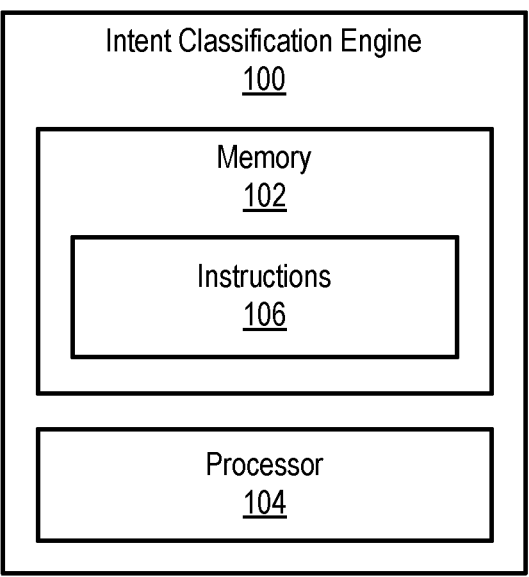
FIG. 1 shows an illustrative intent classification engine configured to determine intent classifications for text transcripts in accordance with principles described herein.

Computer-implemented methods and systems for determining intent from text transcripts are described herein. In some implementations, the methods and system may use feature aggregation to determine intent classifications for text transcripts. The feature aggregation may be performed in a manner configured to denoise intent classifications for the text transcripts, such as described herein.

As described above, businesses may engage in communications with their customers for a variety of reasons, such as sales transactions, customer support transactions, and/or other such matters that may call for communication between the customer and a representative of the business. Businesses may desire to determine an accurate intent of the customer during communications with the business to effectively respond to customer demands. In many cases, however, such communications may be overly lengthy conversations that relate to many different purposes and/or topics.

Consider, for example, a conversation between a customer and customer support agent for an airline company. The conversation may begin with formal pleasantries and a conversation about the weather. The conversation may then shift to a quick resolution for a minor issue, such as a request to clarify an airline policy. The conversation may then finally address the primary intent of the customer, which may be a request for a refund for a plane ticket purchase. However, the primary intent itself may relate to inquiries about several subtopics, such as alternative options to travel to a given destination. In such cases, it may be difficult to determine an accurate intent among many different possible intent classifications.

To address these and/or other challenges, computer-implemented methods and systems for determining intent classifications for text transcripts are described herein, such as by using feature aggregation to determine intent classifications for text transcripts. In some embodiments, for example, an intent classification engine may be configured to access a text transcript (e.g., a text transcript of a customer interaction). The intent classification engine may determine one or more features associated with the text transcript, such as a set of local intent classifications. The intent classification may generate an aggregate embedding vector based on the one or more features and provide the aggregate embedding vector as an input to a trained model configured to output an intent classification for the text transcript.

Determining an intent classification with an intent classification engine in this manner may provide various benefits and/or advantages. For example, the intent classification engine may provide more accurate intent classifications by denoising sets of local intent classifications, particularly sets associated with long text transcripts. This may allow businesses to effectively respond to customer demands during and/or after customer interactions, thus improving customer satisfaction and retention. Additionally, customer interactions may be more efficiently resolved in a prompt and/or satisfactory manner, thus conserving resources and reducing customer wait times. This may be particularly advantageous for an automated customer service agent, as the automated customer service agent may quickly and accurately respond to customer demands without the need to transfer the user to a human customer service agent. Additional and/or alternative benefits and/or advantages provided by the example embodiments described herein may be made apparent herein.

FIG. 1 shows an illustrative intent classification engine 100 ("engine 100") configured to determine intent classifications for text transcripts in accordance with principles described herein. Engine 100 may be implemented by computer resources such as processors, memory facilities, storage facilities, communication interfaces, and so forth, implemented on one or more computing systems described in more detail below. In some examples, engine 100 (or components thereof) may be implemented by multi-access edge compute (MEC) server systems operating on a provider network (e.g., a 5G cellular data network or other carrier network, etc.), by cloud compute server systems running containerized applications, virtual machines, or other distributed software, by on-premise server systems, by user equipment devices (e.g., mobile devices, extended reality presentation devices, etc.), by some combination of these, or by other suitable computing systems as may serve a particular implementation.

Engine 100 may include memory resources configured to store instructions, as well as one or more processors communicatively coupled to the memory resources and configured to execute the instructions to perform functions described herein. For example, a generalized representation of engine 100 is shown in FIG. 1 to include a memory 102 and a processor 104 selectively and communicatively coupled to one another. Memory 102 and processor 104 may include or be implemented by computer hardware that is configured to store and/or execute computer software. Various other components of computer hardware and/or software not explicitly shown in FIG. 1 (e.g., networking and communication interfaces, etc.) may also be included within engine 100. In certain embodiments, memory facilities represented by memory 102 and processors represented by processor 104 may be distributed between multiple computing systems and/or multiple locations as may serve a particular implementation.

One or more memory facilities represented by memory 102 may store and/or otherwise maintain executable data used by one or more processors represented by processor 104 to perform any of the functionality described herein. For example, as shown, memory 102 may store instructions 106 that may be executed by processor 104. Memory 102 may represent (e.g., may be implemented by) one or more memory or storage devices, including any memory or storage devices described herein, that are configured to store data in a non-transitory manner. Instructions 106 may be executed by processor 104 to cause engine 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may represent (e.g., may be implemented by) one or more computer processing devices, including general-purpose processors (e.g., central processing units (CPUs), graphics processing units (GPUs), microprocessors, etc.), special-purpose processors (e.g., application-specific integrated circuits (ASICs), field-programmable gate arrays (FPGAs), etc.), or the like. Using processor 104 (e.g., when the processor is directed to perform operations represented by instructions 106 stored in memory 102), engine 100 may perform functions associated with determining intent classifications for text transcripts in accordance with methods and systems described herein and/or as may serve a particular implementation.

Figure 2:
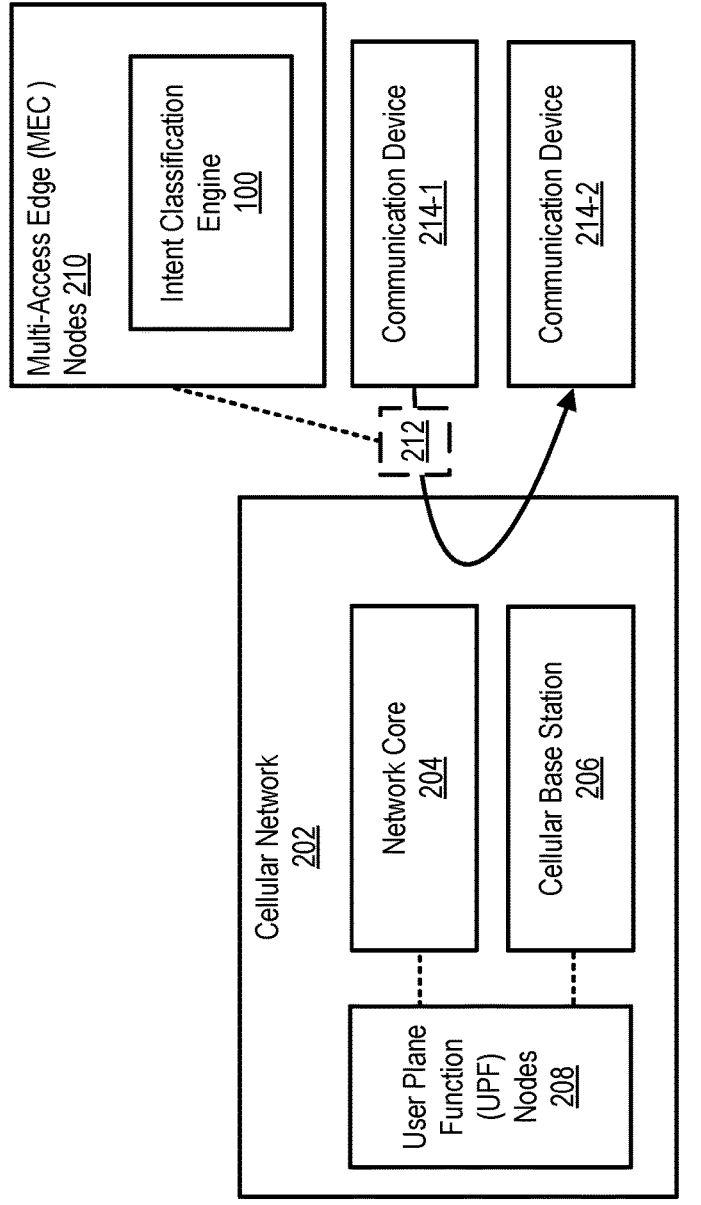
FIG. 2 shows an illustrative implementation of an intent classification engine in an example system in accordance with principles described herein.

FIG. 2 shows an illustrative system 200 that includes a cellular network 202 that may implement an intent classification engine configured to determine an intent classification for a text transcript in accordance with principles described herein. As shown, cellular network 202 may include a network core 204 that may be located at one or more centralized sites of cellular network 202, a cellular base station 206 that may be located at an edge site of cellular network 202, a set of user plane function (UPF) nodes 208 that may be deployed to cellular network 202 at a plurality of sites including the edge site and the one or more centralized sites, and a set of multi-access edge compute (MEC) nodes 210. In operation, cellular base station 206 of cellular network 202 may be configured to receive a data communication 212 that is to be delivered from a first communication device 214-1 (e.g., a cellular phone associated with a customer) to a second communication device 214-2 (e.g., a cellular phone associated with a call center). With components thus configured, cellular network 202 may be capable, based on the processing by the particular UPF node 208, of delivering data communication 212 from communication device 214-1 to communication device 214-2.

Cellular network 202 may be implemented as any suitable type of wireless network. One type of wireless network that may be well-positioned to implement cellular network 202 is a cellular network employing technologies that allow for user plane functions (e.g., data routing and forwarding, etc.) to be performed at different parts of the network (e.g., at a base station disposed at a desirable edge site, at the network core disposed at the central site, etc.). For example, cellular network 202 may be implemented as a 5G cellular network that is designed to provide higher data rates, lower latency, better reliability, and/or other benefits, features, and/or capabilities that may not be provided by other types or generations of cellular networks. A few such benefits of 5G networks may include, for instance, improved network capacity (e.g., an ability to support more devices and traffic than previous generation systems), reduced latency (e.g., an ability to transport data communications with reduced amounts of delay between transmission and receipt), enhanced security, and so forth.

In some examples, all or portions of cellular network 202 may be implemented as a "private" network that is independent from a "public" cellular network associated with a cellular service provider (e.g., the public 5G network of the cellular service provider). For example, it may be advantageous for an entity to own and/or control (e.g., with support of the cellular provider) some or all of the equipment implementing cellular network 202. In this way, cellular network 202 and its various components may be tuned or optimized to serve a particular application of interest. For example, base stations such as cellular base station 206 may be placed strategically with respect to the locations of communication devices such as communication devices 214 (e.g., a phone at a call center responding to customer calls) and UPF nodes 208 may be deployed or made available not only at centralized locations but also at edge locations such as locations of base stations associated with the communication devices 214. Software (e.g., an intent classification engine) deployed to cellular network 202 may also be specifically configured with respect to the desired application (e.g., configured to use feature aggregation to determine an intent classification for a text transcript) and deployed and maintained within the private network in ways that may require more overhead and oversight if the cellular network were a public network accessed by millions of consumers.

In other examples, cellular network 202 may be implemented as or incorporated within a public cellular network or other public network (e.g., the internet). For instance, in the event that an entity setting up and using cellular network 202 (e.g., a call center) is unable to procure sufficient spectrum rights for cellular network 202 (or when other such challenges arise), a portion of a public network (for which spectrum rights are already procured and so forth) may be adapted to perform the functions of cellular network 202 described herein. In this scenario, use of cellular network

202 may be provided to the entity (e.g., by the cellular provider who manages the public cellular network) using an "as-a-service" model or the like. One advantage of this type of scenario may be that portions of network components may be utilized on an as-needed basis (e.g., a portion of the overall bandwidth that a UPF or MEC node may have) while other portions of the network components (e.g., whatever other bandwidth the UPF or MEC node may have available) can be employed for other uses (e.g., serving public customers, etc.).

Network core 204 may serve as the control and/or interconnection facilities for cellular network 202 and, as such, may be disposed in one or more centralized locations (e.g., not necessarily proximate to communication devices 214 at the edge of the network). Network core 204 may be configured to provide functions such as, for example, authentication and authorization of users, session management for data traffic, policy management for network resources, network slicing to create dedicated virtual networks (network slices) for different applications, security for data traffic, quality of service (Qos) management for different types of communications, and so forth. In some examples, network core 204 may implement a cloud-native architecture where individual network functions are deployed as instances of software elements (e.g., virtual machines, containers, microservices, and the like) executing on hardware and dynamically scalable according to need and demand. This architecture allows for scalable and flexible deployments to support various services (e.g., private services for which cellular network 202 may be specifically configured, public services in examples where cellular network 202 is a public cellular network, etc.).

Cellular base station 206 may represent one of a plurality of base stations geographically distributed throughout the footprint of cellular network 202. Cellular base station 206 may serve or facilitate functions such as radio access (e.g., facilitating wireless radio communication between communication devices by encoding and decoding data, managing radio resources, etc.), mobility (e.g., managing handoff as devices move between cells, etc.), security (e.g., managing various aspects of encryption, authentication, authorization, etc.), QoS enforcement (e.g., ensuring that different applications and communications are properly prioritized so that different sets of parameters may all be satisfied, etc.), network slicing support, signaling, network and device monitoring, software and firmware maintenance, and so forth. In some embodiments, cellular base station 206 may include or be configured to implement UPF and/or MEC functionality. In some examples, this may allow for data to be exchanged between communication devices locally without traveling to network core 204.

The set of UPF nodes of cellular network 202 (referred to individually as UPF nodes 208 or collectively as the set of UPF nodes 208) are shown in FIG. 2 to be associated with both network core 204 and with cellular base station 206. As such, it will be understood that UPF nodes 208 may be implemented and/or deployed to the central locations of network core 204 and/or the edge locations of cellular base station 206 (as well as other edge locations of other base stations included in the cellular network and not explicitly represented in FIG. 2).

Wherever each UPF node 208 in the set is deployed or implemented (e.g., at an edge site associated with a cellular base station, at a central site associated with the network core, etc.), the UPF node 208 may be configured to process data communications 212. As used herein, this "processing" of data communication by UPF node 208 may refer to how the communication is routed and forwarded through the cellular network (e.g., analogous to the routing and forwarding performed by the serving gateway (SGW) of a 4G cellular network), how the communication is routed and forwarded to external networks (e.g., analogous to the routing and forwarding performed by the packet data network gateway (PGW) of a 4G cellular network), and/or how the data embedded in the communication is otherwise used and manipulated by the network. Accordingly, each UPF node 208 in the set of UPF nodes may be configured to perform user plane functions such as routing (e.g., determining the efficient and reliable data paths for traffic to travel through the network), forwarding (e.g., sending data traffic to the correct destination as called for by the transport protocol, etc.), security, QoS, and other types of processing of data traffic within cellular network 202. UPF nodes 208 may be implemented as dedicated hardware devices, as virtualized network functions that run on computing systems that are also implementing other virtualized network functions or performing other tasks, or in any other suitable way. In some examples, a UPF node 208 may be implemented as an application on a MEC device.

In some examples, a UPF node 208 may be associated with (e.g., deployed alongside or operating in connection with) a MEC node 210 that performs certain data processing functions with respect to the data communication. As illustrated, for example, a MEC node 210 may deploy an intent classification engine (e.g., intent classification engine 100) configured to determine an intent classification for a text transcript in any of the ways described herein. When implemented on the edge of the network, UPF nodes 208 and MEC nodes 210 may improve network latency and reduce the load on network core 204, thereby making cellular network 202 more flexible, responsive, and scalable for use with various applications, including with respect to determining intent classifications for text transcripts and providing those intent classifications for use by one or more applications (e.g., customer service agent applications).

Data communication 212 may represent any particular communication between network endpoints such as communication device 214-1 (e.g., the transmitting device in this particular example) and communication device 214-2 (e.g., the receiving device in this particular example). For instance, if the communication devices 214 are cellular phones, data communication 212 may include a message that is part of a phone call and/or a text thread between a customer and a customer service agent regarding one or more customer demands and/or inquiries.

While FIG. 2 illustrates one example implementation of intent classification engine 100, intent classification engine 100 may be implemented in other ways and/or configurations in other embodiments, including in any of the example implementations mentioned herein. For example, intent classification engine 100 may be implemented in a data center environment, a cloud environment, a compute-as-a-service (CaaS) environment, a web services environment, a containerized environment, a virtualized compute environment, an on-premises compute environment, a public or private compute environment, a distributed compute environment, a user device environment (e.g., on one or more user devices), a server system, any other suitable computing environment in which the operations of intent classification engine 100 may be performed, or distributed across any combination of sub-combination of such environments.

FIG. 3 shows an illustrative method 300 for using feature aggregation to determine an intent classification for a text transcript in accordance with principles described herein.

While FIG. 3 shows illustrative operations 302-308 according to one implementation, other implementations may omit, add to, reorder, and/or modify any of the operations 302-308 shown in FIG. 3. In some examples, multiple operations shown in FIG. 3 or described in relation to FIG. 3 may be performed concurrently (e.g., in parallel) with one another, rather than being performed sequentially as illustrated and/or described. One or more of the operations shown in FIG. 3 may be performed by an intent classification engine such as engine 100 and/or any implementation thereof. Each of operations 302-312 of method 300 will now be described in more detail as the operations may be performed by an implementation of engine 100 (e.g., by processor 104 executing instructions 106 stored in memory 102).

At operation 302, engine 100 may access a text transcript. The text transcript may be associated with (e.g., may be a textual representation of) any suitable interaction (e.g., a phone call, an online chat, a set of email messages, a video conference, etc.) between a pair of entities. For example, one entity may be a representative of a business engaged in a customer interaction (e.g., a human or automated sales representative or other such entity, a human or automated tech support representative or customer service representative or other such contact center agent, etc.). Correspondingly, the other entity may be a customer of the business and/or a communication device used by the customer of the business. In some embodiments, the interaction may be conducted over a cellular network (e.g., cellular network 202) between a set of communication devices (e.g., communication devices 214), and/or any other suitable network. The interaction may be associated with any suitable format, such as a phone call, an online chat, a set of email messages, a set of text messages, and/or an in-person conversation. As used herein, an entity may refer to any company, user, and/or other organization and/or person that engages in an interaction with another party.

The text transcript may be generated at any suitable source associated with the interaction. For example, the text transcript may be generated at a computing device, such as a computing device involved in the interaction, a computing device that accesses data representative of the interaction, and/or a computing device at a location associated with a business engaged in the interaction (e.g., a computing device located in a retail outlet, a call center, a helpdesk, etc.). In some embodiments, the text transcript may be generated in real-time while the interaction is on-going.

At operation 304, engine 100 may determine one or more features associated with the text transcript. The one or more features may be associated with any suitable aspect of the text transcript. For example, the one or more features may include one or more of a local intent classification associated with the text transcript, a text type associated with the text transcript, a part-of-speech tag associated with the text transcript, an emoticon tag associated with the text transcript, an emotion type associated with the text transcript, an intent recency associated with the text transcript, an intent frequency associated with the text transcript, a sequence weight associated with the text transcript, a geo-location associated with the text transcript, a co-occurrence ranking associated with the text transcript, and/or a previous intent associated with the text transcript.

The local intent classification may include any suitable intent classification associated with a subset of the text transcript. As used herein, an intent classification may be any classification that indicates an intent of a text sequence (e.g., a text transcript, a word, a sentence, etc.). In some embodiments, the local intent classification may be associated with any combination of words, phrases, sentences, paragraphs, and/or any other suitable subsets within the text transcript. The local intent classification may be of any suitable classification type, such as a binary classification (e.g., positive/negative), a multiclass classification (e.g., billing/technical support/feedback), and/or a numerical classification (e.g., a positivity scale).

The text type may include any suitable text type associated with the text transcript. For example, the text type may include a grammar type associated with a sentence, such as a declarative sentence, an exclamatory sentence, a compound sentence, an interrogative sentence, an imperative sentence, and/or a conjunctive sentence. In other examples, the text type may include a content type associated with the text transcript, such as narrative text, descriptive text, persuasive text, conversational text, argumentative text, and/or instructional text.

The part-of-speech tag may include any suitable tag indicating a part of speech associated with the text transcript. Each tag may be associated with a word in the text transcript and indicate a part of speech for a corresponding word. For example, the word "dog" may be associated with the tag "noun."

The emoticon tag may include any suitable tag associated with an emotion and/or emoji in the text transcript. Each tag may indicate an emoticon type, such as "happy face." In some embodiments, the tag may indicate an emotion associated with the emoticon type, such as "happy."

The emotion type may include any suitable emotion type associated with the text transcript. In some embodiments, for example, the emotion type may be a discrete classification, such as a negative emotion, a positive emotion, a satisfied emotion, an unsatisfied emotion, an angry emotion, a confused emotion, a fearful emotion, and/or a hopeful emotion. In some embodiments, the emotion type may include a numerical value associated with an emotion, such as a positivity value. In some embodiments, the emotion type may be based on emoticon tags associated with the text transcript.

The intent recency may include any suitable recency value of an intent classification associated with the text transcript. For example, the intent recency may indicate how recently an intent classification associated with a specific entity occurred in past text transcripts. The intent recency may be based on any suitable heuristic and/or algorithm, such as determining an average occurrence time, determining a most recent occurrence time, and/or determining an oldest occurrence time. In some embodiments, intent recency of an intent classification may be weighted according to an average recency value of intent classifications associated with the intent classification.

The intent frequency may include any suitable frequency level of an intent classification associated with the text transcript. The intent frequency may be based on any suitable heuristic and/or algorithm. For example, the intent frequency may indicate how frequently an intent classification occurred within a specified time period. In other examples, the intent frequency may indicate how frequently an intent classification occurred within a predetermined set of text transcripts. In some embodiments, the intent frequency of an intent classification may be weighted according to an average frequency level of intent classifications associated with the intent classification.

The sequence weight may include any suitable weight associated with a text sequence within the text transcript. The sequence weight may be determined by any suitable heuristic and/or algorithm. In some embodiments, for example, the sequence weight may be determined by a location within the text transcript that a text sequence occurs in. For example, a text sequence occurring earlier within the text transcript may be assigned a higher sequence weight, while a text sequence occurring later may be assigned a lower sequence weight. The text sequence may be of any suitable length and/or format, such as a word, sentence, phrase, paragraph, and/or n-gram.

The geo-location may include any suitable geo-location associated with the text transcript. In some situations, certain intent classifications may predominate a specified geo-location. For example, intent classifications associated with international travel (e.g., booking flights) may predominate international airports. In this manner, each geo-location may be associated with one or more predominant intent classifications.

The co-occurrence ranking may include any suitable co-occurrence ranking of local intent classifications associated with the text transcript. Any number of pairs of local intent classifications associated with the text transcript may be assigned a co-occurrence ranking. The co-occurrence ranking may indicate how frequently a respective pair of local intent classifications co-occurs in a given text sequence, such as a text transcript, a phrase, and/or a sentence. In some embodiments, the co-occurrence ranking may be based on a fixed window size around a local intent classification (e.g., a fixed number of sentences surrounding the local intent classification). In some embodiments, the co-occurrence ranking may include a numerical value.

The previous intent may include any suitable intent classification associated with the text transcript that has occurred with a specified entity in the past. In some embodiments, the previous intent may be weighted according to how recently the previous intent occurred in the past (e.g., weighted more heavily if the previous intent occurred very recently).

In some embodiments, engine 100 may generate a graph and determine at least one of the one or more features using the graph. The graph may be any suitable type of graph, such as a network graph, a tree, a weighted graph, a directed graph, and/or an undirected graph. The graph may include a plurality of nodes interconnected by a plurality of edges. Each node may be associated with any aspect of the text transcript, such as a text sequence associated with the text transcript (e.g., words, phrases, sentences, paragraph, etc.) and/or a feature associated with the text transcript. Each edge may represent a relationship between nodes. For example, an edge may be associated with a weight and/or a direction representative of a relationship between two nodes of the graph.

Any suitable combination of the one or more features may be determined using the graph. As described further herein, for example, the graph may be a co-occurrence graph for determining a co-occurrence ranking. In other examples, the graph may be a geo-location graph for determining a geo-location for an intent classification. Each node of the graph may correspond to a geographic location of an instance of the intent classification within one or more text transcripts. Each edge of the graph may include an edge weight indicating a distance between the two corresponding nodes. The geo-location may be determined by selecting a node using any suitable heuristic and/or algorithm (e.g., selecting a node that minimizes a total traveling distance to all other nodes, selecting a node that is nearest to a geographic center of the graph, etc.).

At operation 306, engine 100 may generate, based on the one or more features, an aggregate embedding vector. The aggregate embedding vector may include any suitable multidimensional vector for representing an aggregation of the one or more features. The aggregate embedding vector may be generated using any suitable embedding method and/or algorithm. In some embodiments, the aggregate embedding vector may be generated by a machine learning model, such as one or more decision tree learning algorithms, association rule learning algorithms, artificial neural network learning algorithms, deep learning algorithms, bitmap algorithms, and/or any other suitable machine learning technique. In some embodiments, the model may be implemented by one or more neural networks, such as one or more deep convolutional neural networks (CNN) using internal memories of its respective kernels (filters), recurrent neural networks (RNN), and/or long/short term memory neural networks (LSTM). In some embodiments, the aggregate embedding vector may be implemented by one or more natural language processing models, such as skip-grams, n-grams, continuous bag-of-words, transformers, and/or any other suitable technique.

In some alternative embodiments, engine 100 may aggregate the one or more features without generating an aggregate embedding vector, such as determining a statistical value (e.g., a weighted average, a summation, a standard deviation, etc.) associated with the one or more features, and/or generating one or more clusters associated with the one or more features.

At operation 308, engine 100 may provide the aggregate embedding vector as an input to a trained model configured to output an intent classification. The trained model may be configured to output the intent classification by denoising the aggregate embedding vector. In some embodiments, for example, the trained model may be configured to output the intent classification based on a selection of a subset of local intent classifications associated with the aggregate embedding vector. As an example, the aggregate embedding vector may be associated with local intent classifications such as "troubleshooting", "disconnect", and "payment." The trained model may select from these local intent classifications and output "troubleshooting" as the intent classification. In some embodiments, the trained model may be configured to output the intent classification based on a weighted combination of local intent classifications (e.g., a weighted combination of feature vectors).

In some embodiments, the trained model may include a machine learning model. The trained model may be configured to implement one or more decision tree learning algorithms, association rule learning algorithms, artificial neural network learning algorithms, deep learning algorithms, bitmap algorithms, and/or any other suitable machine learning model. In some embodiments, the trained model may be implemented by one or more neural networks, such as one or more deep convolutional neural networks (CNN) using internal memories of its respective kernels (filters), recurrent neural networks (RNN), and/or long/short term memory neural networks (LSTM). The trained model may be multi-layer. For example, the trained model may be implemented by a neural network that includes an input layer, one or more hidden layers, and an output layer. The trained model may include one or more dense layers.

In some embodiments, the trained model may be trained with various training examples that may each include a text sequence (e.g., a phrase, a sentence, a text transcript, etc.). In some examples, the training examples may include one or more attributes of the text sequences. For example, each text sequence may be labeled with one or more intent classifications (e.g., supervised learning). In other examples, each text sequence may be unlabeled (e.g., unsupervised learning). During a training stage, the trained model may learn to determine an intent classification for a given text sequence from the training examples. In particular, the machine learning model may adjust its model parameters (e.g., weights for a neural network model) to determine an intent classification for the given text sequence based on one or more features associated with the text sequence. For example, the machine learning model may learn to select an intent classification from among a set of local intent classifications (e.g., through a denoising process) based on one or more features associated with the text sequence, such as co-occurrence rankings associated with the text sequence, intent recencies associated with the text sequence, intent frequencies associated with the text sequence, and/or part-of-speech tags associated with the text sequence.

It is to be appreciated that engine 100 may perform any combination of operations 302-308 at any suitable time period according to the specifications of a particular implementation. For example, at operation 302, engine 100 may access the text transcript after the entirety of the text transcript has been generated (e.g., after a phone call has ended and has been converted into text). Engine 100 may accordingly generate an intent classification for the entirety of the text transcript. In other examples, at operation 302, engine 100 may access the text transcript in real-time while the text transcript is being generated. Engine 100 may accordingly generate an intent classification for a subset of the text transcript. In some embodiments, engine 100 may access the text transcript in real-time in accordance with any suitable heuristic and/or algorithm, such as accessing the text transcript after a threshold amount of text (e.g., a predetermined number of words, phrases, sentence, and/or paragraphs) within the text transcript has been generated and/or a threshold time period has passed.

In some embodiments, an operation of method 300 may be performed by way of a plurality of sub-operations that will also be referred to herein as operations of the method. For instance, as illustrated in FIG. 4, operation 304 may include, at operation 402, engine 100 generating a graph including a plurality of nodes interconnected by a plurality of edges. Each node of the graph may correspond to a local intent classification associated with the text transcript, and each edge of the graph may correspond to a co-occurrence frequency between two respective nodes. In some embodiments, a co-occurrence frequency may be generated based on occurrences and proximities of local intent classifications to one another in the text transcript. In some embodiments, a co-occurrence frequency may be generated from previous text transcripts associated with its two respective nodes. In some embodiments, a co-occurrence frequency may be generated based on both information from the text transcript and information from previous text transcripts.

At operation 404, engine 100 may determine, based on the graph, a co-occurrence ranking associated with the local intent classifications. The co-occurrence ranking may be included in the one or more features associated with the text transcript.

In some embodiments, as illustrated in FIG. 5, operation 304 may include, at operation 502, engine 100 providing one or more portions of the text transcript as inputs to a second trained model configured to output one or more local intent classifications. The one or more portions of the text transcript may include any suitable subset of the text transcripts, such as words, phrases, sentences, and/or paragraphs. The local intent classifications may be included in the one or more features associated with the text transcript.

In some embodiments, the second trained model may include a machine learning model. The second trained model may be configured to implement one or more decision tree learning algorithms, association rule learning algorithms, artificial neural network learning algorithms, deep learning algorithms, bitmap algorithms, and/or any other suitable machine learning model. In some embodiments, the trained model may be implemented by one or more neural networks, such as one or more deep convolutional neural networks (CNN) using internal memories of its respective kernels (filters), recurrent neural networks (RNN), and/or long/short term memory neural networks (LSTM). The trained model may be multi-layer. For example, the trained model may be implemented by a neural network that includes an input layer, one or more hidden layers, and an output layer. The trained model may include one or more dense layers. The trained model may be trained on past text transcript data associated with the text transcript.

In some embodiments, the trained model may be trained with various training examples that may each include a text sequence (e.g., a phrase, a sentence, a text transcript, etc.). In some examples, the training examples may include one or more attributes of the text sequences. For example, each text sequence may be labeled with one or more local intent classifications (e.g., supervised learning). In other examples, the text sequence may be unlabeled (e.g., unsupervised learning). During a training stage, the trained model may learn to determine one or more local intent classifications for a given text sequence from the training examples. In particular, the machine learning model may adjust its model parameters (e.g., weights for a neural network model) to determine the one or more local intent classifications for the given text sequence based on one or more features associated with the text sequence. For example, the machine learning model may learn to determine the local intent classifications based on one or more features associated with the text sequence, such as part-of-speech tags associated with the text sequence, emotion tags associated with the text sequence, emotion types associated with the text sequence, and/or geo-locations associated with the text sequence.

Figure 6A:
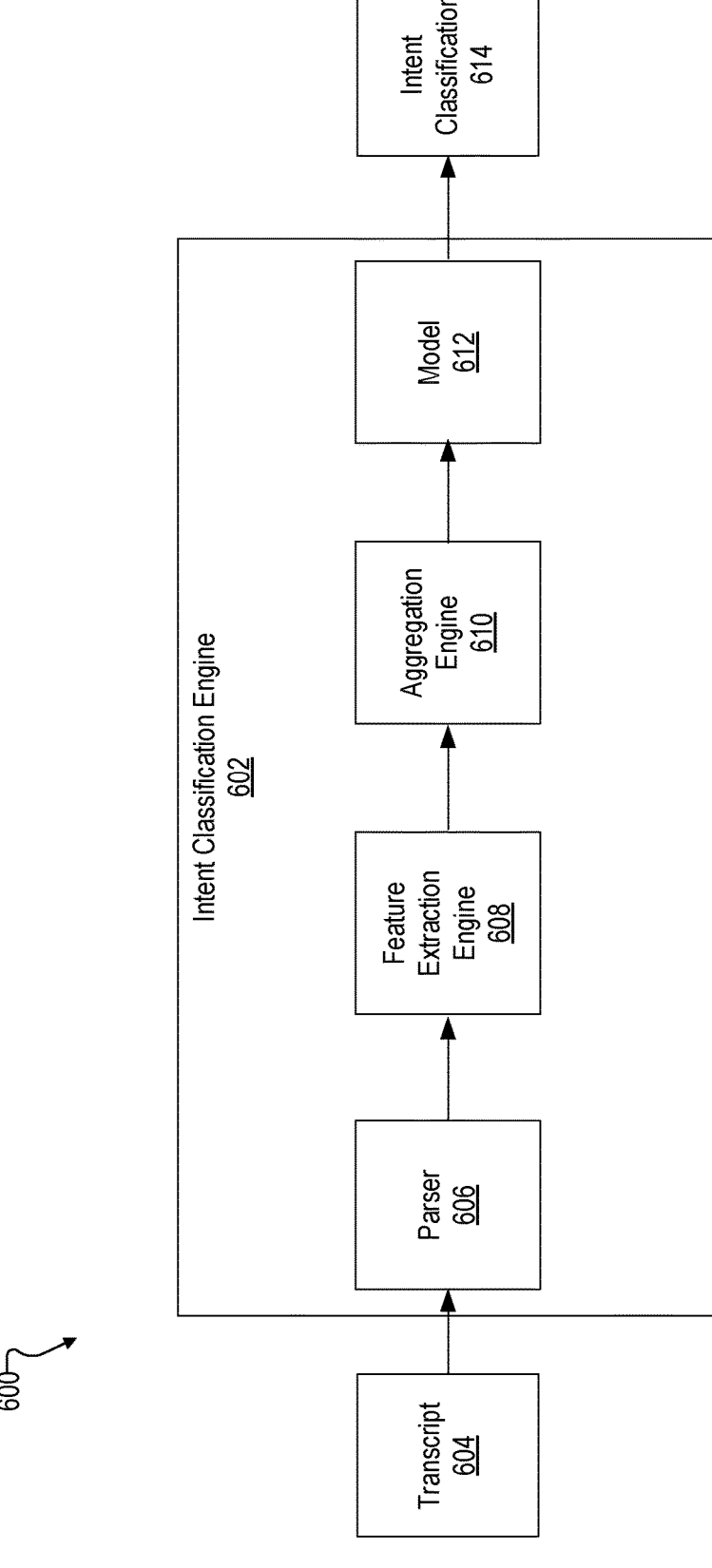

To illustrate an example intent classification process that may be performed by an intent classification engine, FIG. 6A shows illustrative aspects of a system 600 in accordance with principles described herein. One or more of aspects of FIG. 6A may be performed by an intent classification engine such as intent classification engine 602 ("engine 602") and/or any implementation thereof. In some examples, engine 602 may be an illustrative implementation of engine 100. Engine 602 may be configured to perform any of the operations described herein, such as operations 302 to 308 of method 300 shown in FIG. 3. Engine 602 may include or otherwise access any number of suitable components to perform its operations. However, it is to be appreciated that any combination of the components illustrated in FIG. 6A may be deployed within any suitable engine and/or environment (e.g., a remote processing facility).

As illustrated, engine 602 may access a text transcript 604. Text transcript 604 may be associated with an interaction between a pair of entities (e.g., a phone call between a customer and a business representative). Engine 602 may input text transcript 604 into a parser 606. Parser 606 may be configured to parse text transcript 604 in any suitable manner, such as tokenizing text transcript 604 into one or more components (e.g., words, phrases, sentences, etc.), identifying named entities (e.g., names of people, organizations, locations, etc.), and/or analyzing syntax (e.g., identifying subject-verb-object relationships, sentence constituents, etc.). Parser 606 may send the parsed text transcript to a feature extraction engine 608. Feature extraction engine 608 may be configured to determine one or more features of the parsed text transcript (and/or any other suitable text transcript). Feature extraction engine 608 may send the one or more features to an aggregation engine 610. Aggregation engine 610 may be configured to aggregate the one or more features in any suitable manner. For example, aggregation engine 610 may be configured to generate an aggregate embedding vector based on the one or more features. Aggregation engine 610 may send the generated aggregate embedding vector to a model 612. Based on the aggregate embedding vector, model 612 may determine an intent classification 614 associated with text transcript 604.

FIG. 6B shows illustrative aspects of system 600. Feature extraction engine 608 within system 600 may include or otherwise access one or more components for determining one or more features of text transcript 604. As illustrated, for example, feature extraction engine 608 may include a local intent classification model 616, a co-occurrence graph 618, and/or a feature data repository 620. The local intent classification model 616 may be configured to determine one or more local intent classifications associated with text transcript 604. The co-occurrence graph 618 may be used to determine one or more co-occurrence frequencies for one or more local intent classifications associated with text transcript 604. Feature data repository 620 may store any number of datasets associated with one or more features of text transcript 604.

Figure 7:
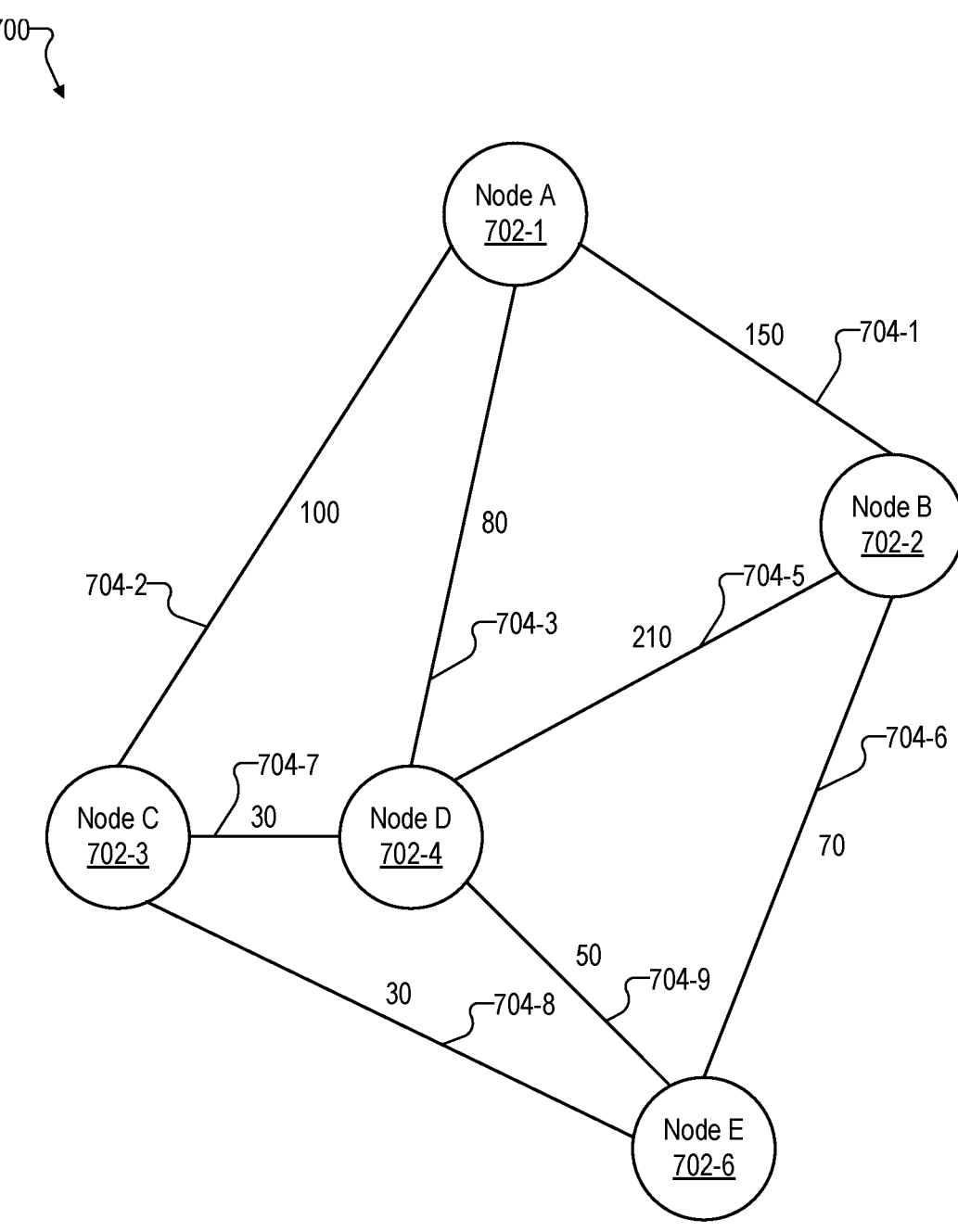
FIG. 7 shows an illustrative co-occurrence graph in accordance with principles described herein.

FIG. 7 shows an illustrative co-occurrence graph 700 in accordance with principles described herein. Graph 700 may be used to perform any of the operations described herein. For example, graph 700 may be used to determine a co-occurrence ranking for one or more local intent classifications associated with text transcript 604 (e.g., at operations 402 and 404). However, it is to be appreciated that graph 700 may be used to determine any feature or suitable combination of the features described herein. Graph 700 may be generated by an intent classification engine (e.g., engine 602) and/or any suitable engine and/or system.

Graph 700 may include a plurality of nodes 702 (e.g., nodes 702-1 to 702-6) interconnected by a plurality of edges 704 (e.g., edges 704-1 to 704-9). Each node of the graph may correspond to a local intent classification associated with a text transcript and each edge of the graph may correspond to a co-occurrence frequency between two respective nodes. For example, as illustrated in FIG. 7, node 702-1 may be connected to node 702-2 by edge 704-1. Node 702-1 may correspond to a local intent classification (e.g., "payment") and node 702-2 may correspond to another local intent classification (e.g., "billing"). Edge 704-1 may correspond to a co-occurrence frequency (e.g., a co-occurrence frequency score of "150") between the local intent classification of node 702-1 and the local intent classification of 702-2.

Each co-occurrence frequency may be determined using any suitable method and/or algorithm. In some embodiments, for example, each co-occurrence frequency may be determined from co-occurrences in previous text transcripts associated with its two respective nodes. In some embodiments, each co-occurrence frequency may be determined by the following formula:

$$\text{Rank}_{AB} = \alpha * \frac{freq_{AB} * (e_a + e_b)}{\sum^n freq * \sum^n e} + \beta,$$

where freq is a frequency of two local intent classifications co-occurring, e is a degree of a node, $\alpha$ is a scaling factor, and B is a bias. However, it is to be appreciated that any suitable formula may be used to determine the co-occurrence frequencies.

Figure 8:
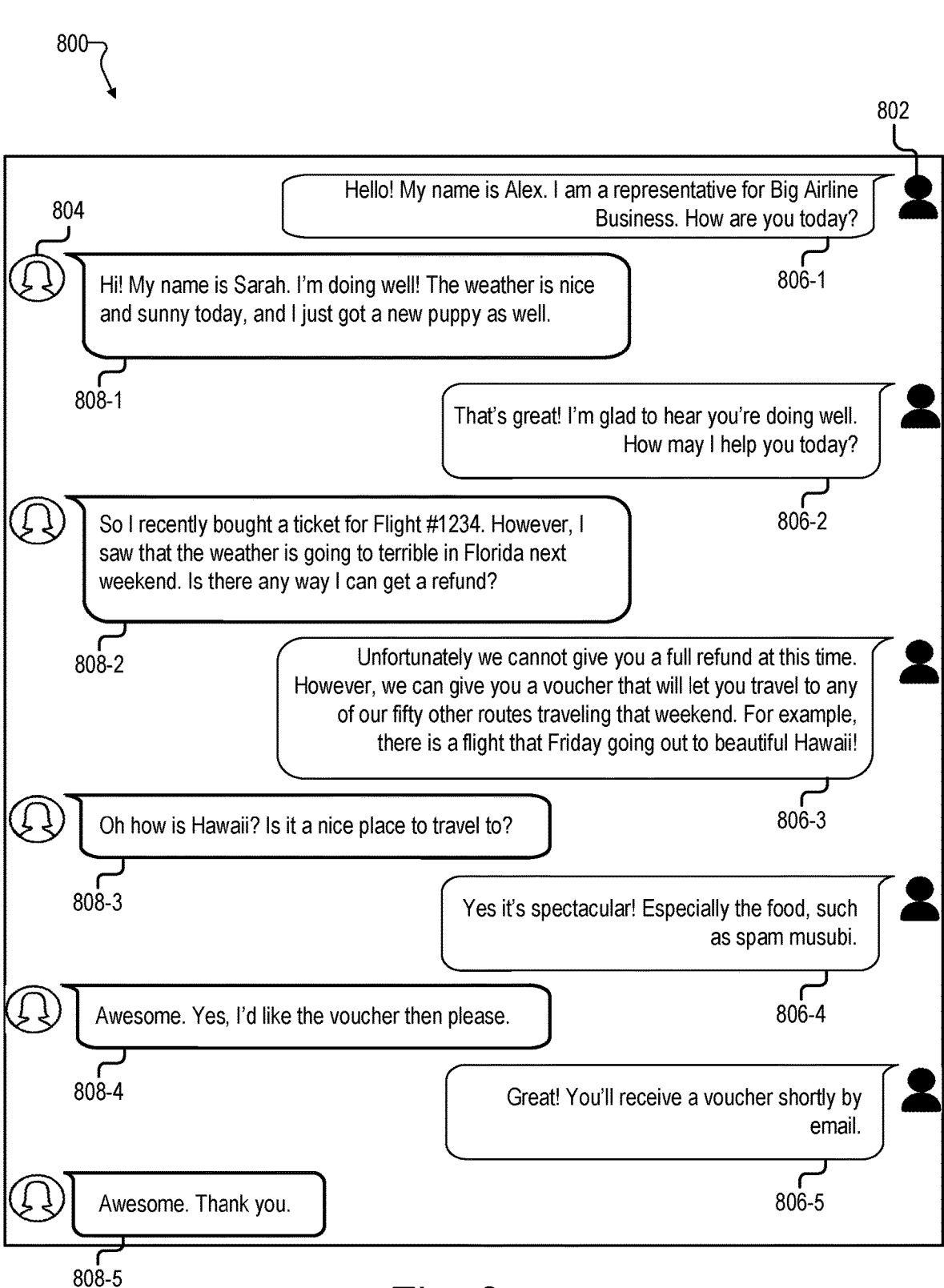
FIG. 8 shows an illustrative representation of a conversation between a customer service agent and a customer in accordance with principles described herein.

FIG. 8 shows an illustrative conversation 800 between a customer service agent 802 and a customer 804 in accordance with principles described herein. Conversation 800 may be associated with any suitable communication format, including textual and/or non-textual formats, such as an online chat, a phone call, a set of email messages, and/or a video conference. Conversation 800 may occur over any suitable network (e.g., cellular network 202) between any suitable set of communication devices (e.g., communication devices 214).

Conversation 800 may include messages 806 (e.g., messages 806-1 to messages 806-5) and messages 808 (e.g., messages 808-1 to messages 808-5). As illustrated, for example, messages 806 may include messages associated with customer service agent 802 and messages 808 may include messages associated with a customer 804. Conversation 800 may be associated with one or more topics. As illustrated, for example, messages 806-1, 808-1, and 806-2 may relate to exchanging introductions, messages 808-2 and 806-3 may relate to a flight booking, messages 808-3 and 806-4 may relate to Hawaii, messages 808-4 and 806-5 may relate to a voucher option, and message 808-5 may relate to exchanging farewells.

Figure 9:
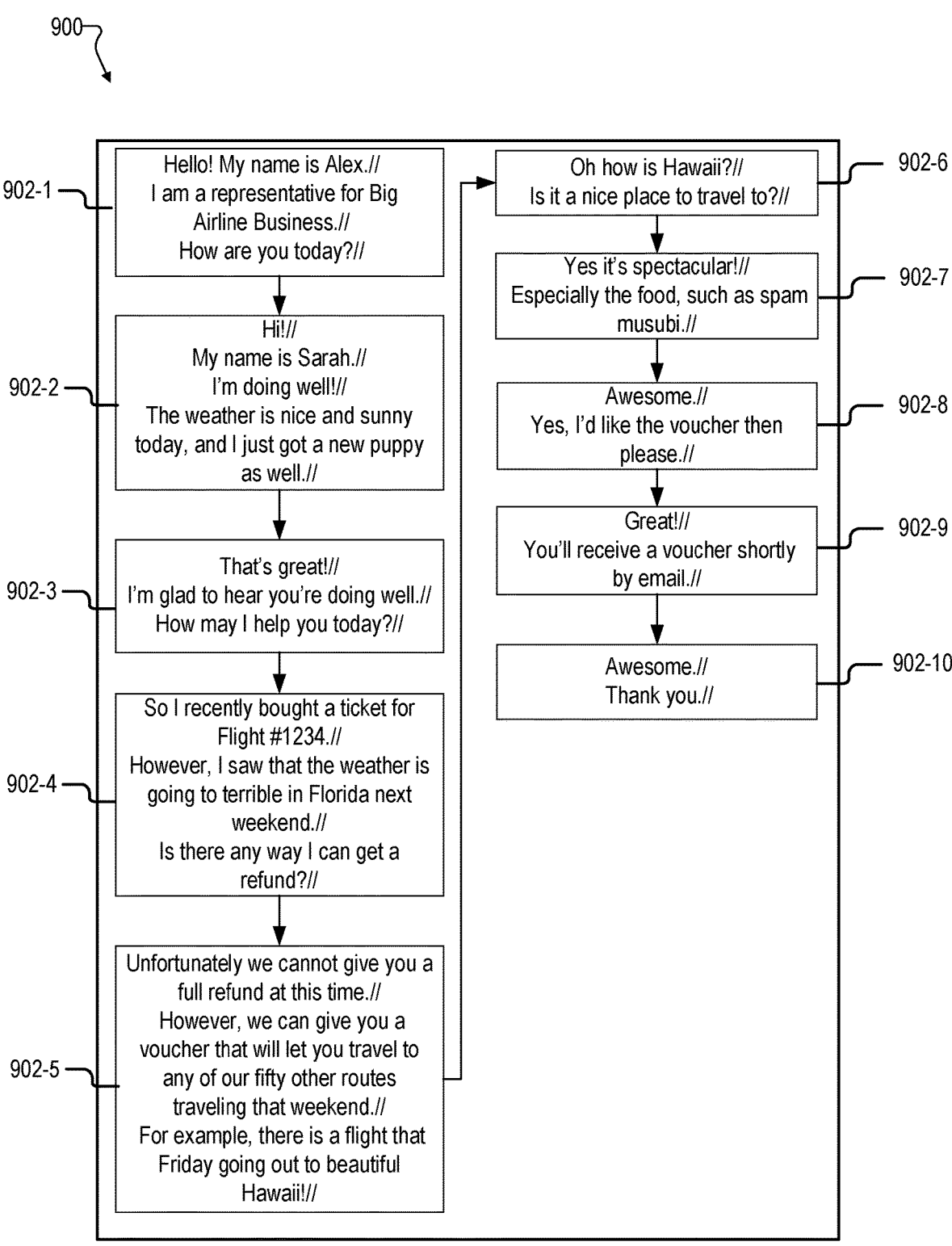
FIG. 9 shows an illustrative text transcript in accordance with principles described herein.

FIG. 9 shows an illustrative text transcript 900 in accordance with principles described herein. Text transcript 900 may be associated with a conversation (e.g., conversation 800) between a customer service agent (e.g., customer service agent 802) and a customer (e.g., customer 804). Text transcript 900 may include one or more text sequences 902 (e.g., sequences 902-1 to 902-10). Each sequence 902 may include one or more phrases and/or sentences. As illustrated in FIG. 9, sequences 902-1 to 902-10 may each correspond to a message 806 and/or a message 808 within conversation 800. For example, sequence 902-1 may correspond to message 806-1, and sequence 902-2 may correspond to message 808-1.

In some embodiments, text transcript 900 may be parsed to determine one or more grammatical features associated with text transcript 900. Text transcript 900 may be parsed in any suitable manner, such as tokenizing text transcript 900 into one or more components (e.g., words, phrases, sentences, etc.), identifying named entities (e.g., names of people, organizations, locations, etc.), and/or analyzing syntax (e.g., identifying subject-verb-object relationships, sentence constituents, etc.). As illustrated, for example, each individual phrase and/or sentence in sequences 902 may be tagged (e.g., using tag "//" attached to each phrase and/or sentence).

Figure 10:
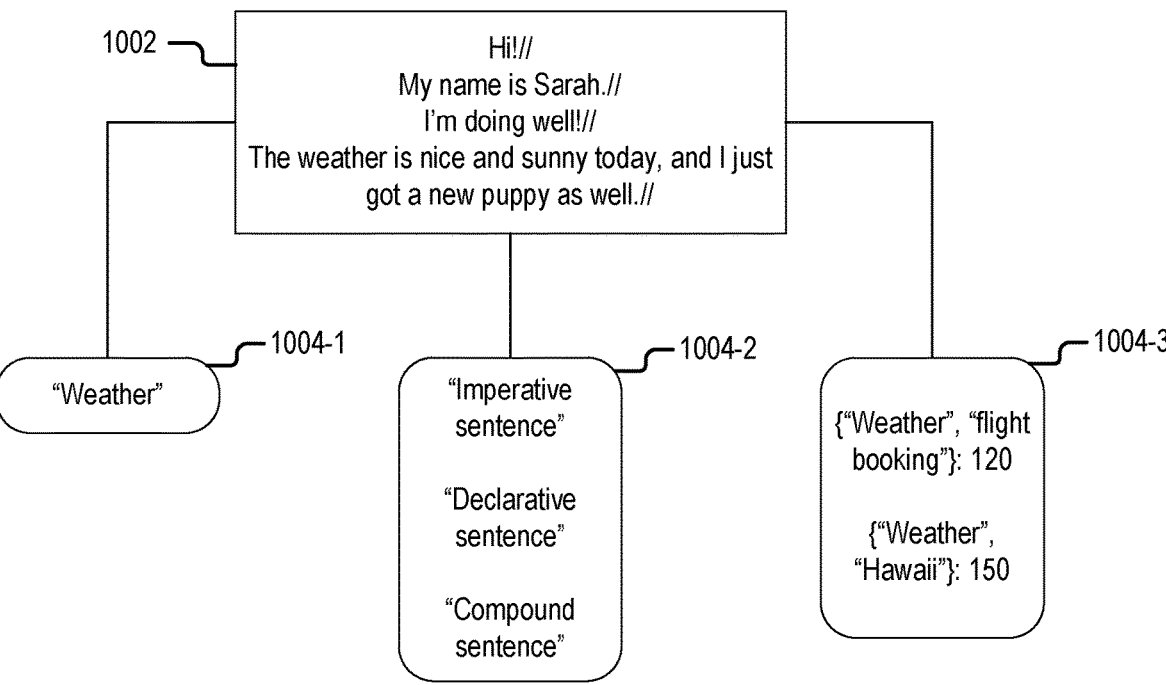
FIG. 10 shows an illustrative configuration that may be used to determine one or more features associated with a text sequence.

FIG. 10 shows an illustrative configuration that may be used to determine one or more features 1004 (e.g., features 1004-1 to 1004-3) associated with a text sequence 1002. Although text sequence 1002 is illustrated as being similar to text sequence 902-2, text sequence 1002 may include any suitable text sequence. Features 1004 may include any of the types of features described herein. As illustrated for example, feature 1004-1 may include one or more local intent classifications (e.g., "weather"), feature 1004-2 may include one or more text types (e.g., "imperative sentence"), and feature 1004-3 may include one or more co-occurrence rankings (e.g., a co-occurrence ranking of 120 for local intent classification pair {"weather", "flight booking"}). Features 1004 may be determined from text sequence 1002 using any suitable feature extraction engine (e.g., feature extraction engine 608) and/or any other suitable engine.

FIG. 11 shows an illustrative computing system 1100 that may implement an intent classification engine configured to determine intent classifications for text transcripts. For example, computing system 1100 may include or implement (or partially implement) any of the various intent classification engine embodiments that have been described herein (e.g., including various implementations of engine 100).

As shown in FIG. 11, computing system 1100 may include a communication interface 1102, a processor 1104, a storage device 1106, and an input/output (I/O) module 1108 communicatively connected via a communication infrastructure 1110. While an illustrative computing system 1100 is shown in FIG. 11, the components illustrated in FIG. 11 are not intended to be limiting. Additional or alternative components may be used in other embodiments. Components of computing system 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing system 1100. For example, one or more applications 1112 residing within storage device 1106 may be configured to direct processor 1104 to perform one or more processes or functions associated with processor 104 of engine 100.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

In the preceding description, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   accessing, by an intent classification engine, a text transcript;
   determining, by the intent classification engine, one or more features associated with the text transcript, the determining the one or more features comprising:
   generating, based at least in part on the text transcript, a graph comprising a plurality of nodes interconnected by a plurality of edges; and
   using the graph to determine at least one of the one or more features associated with the text transcript;
   generating, by the intent classification engine based on the one or more features, an aggregate embedding vector; and
   providing, by the intent classification engine, the aggregate embedding vector as an input to a trained model configured to output an intent classification,
   wherein:
   the determining the one or more features comprises determining, by the intent classification engine based on the graph, a co-occurrence ranking associated with one or more local intent classifications represented in the graph; and
   the one or more features comprises the co-occurrence ranking.

2. The method of claim 1, wherein the one or more features comprises the one or more local intent classifications and one or more of a sentence type, an emotion, an intent recency, an intent frequency, a sequence weight, a geo-location intent, or a previous intent.

3. The method of claim 1, wherein the determining the one or more features comprises:

providing, by the intent classification engine, one or more portions of the text transcript as inputs to a second trained model configured to output the one or more local intent classifications;

wherein the one or more features comprises the one or more local intent classifications.

4. The method of claim 3, wherein each of the one or more portions comprises one or more of a sentence or a phrase within the text transcript.

5. The method of claim 3, wherein the second trained model comprises a multi-layer neural network.

6. The method of claim 1, wherein each node of the graph corresponds to a local intent classification associated with the text transcript and each edge of the graph corresponds to a co-occurrence frequency between two respective nodes.

7. The method of claim 6, where each co-occurrence frequency is based on previous text transcripts associated with the two respective nodes.

8. The method of claim 1, wherein the trained model comprises a multi-layer neural network.

9. The method of claim 1, wherein the text transcript is associated with a customer support interaction with an agent.

10. The method of claim 1, wherein the accessing the text transcript occurs in real-time while the text transcript is being generated.

11. The method of claim 1, wherein the accessing the text transcript occurs in real-time after a threshold number of sentences within the text transcript have been generated.

12. A system comprising:

a memory storing instructions; and one or more processors communicatively coupled to the memory and configured to execute the instructions to perform a process comprising:

accessing a text transcript;

determining one or more features associated with the text transcript, the determining the one or more features comprising:

generating, based at least in part on the text transcript, a graph comprising a plurality of nodes interconnected by a plurality of edges; and using the graph to determine at least one of the one or more features associated with the text transcript;

generating, based on the one or more features, an aggregate embedding vector; and providing the aggregate embedding vector as an input to a trained model configured to output an intent classification, wherein:

the determining the one or more features comprises determining, based on the graph, a co-occurrence ranking associated with one or more local intent classifications represented in the graph; and the one or more features comprises the co-occurrence ranking.

13. The system of claim 12, wherein the determining the one or more features comprises:

providing one or more portions of the text transcript as inputs to a second trained model configured to output the one or more local intent classifications;

wherein the one or more features comprises the one or more local intent classifications.

14. The system of claim 13, wherein each of the one or more portions comprises one or more of a sentence or a phrase within the text transcript.

15. The system of claim 12, wherein each node of the graph corresponds to a local intent classification associated with the text transcript and each edge of the graph corresponds to a co-occurrence frequency between two respective nodes.

16. The system of claim 12, wherein the trained model comprises a multi-layer neural network.

17. The system of claim 12, wherein the accessing the text transcript occurs in real-time after a threshold number of sentences within the text transcript have been generated.

18. A non-transitory computer-readable medium storing instructions that, when executed, direct a processor of a computing device to perform a process comprising:

accessing a text transcript;

determining one or more features associated with the text transcript, the determining the one or more features comprising:

generating, based at least in part on the text transcript, a graph comprising a plurality of nodes interconnected by a plurality of edges; and using the graph to determine at least one of the one or more features associated with the text transcript;

generating, based on the one or more features, an aggregate embedding vector; and providing the aggregate embedding vector as an input to a trained model configured to output an intent classification, wherein:

the determining the one or more features comprises determining, based on the graph, a co-occurrence ranking associated with one or more local intent classifications represented in the graph; and the one or more features comprises the co-occurrence ranking.

19. The non-transitory computer-readable medium of claim 18, wherein the determining the one or more features comprises:

providing one or more portions of the text transcript as inputs to a second trained model configured to output the one or more local intent classifications;

wherein the one or more features comprises the one or more local intent classifications.

20. The non-transitory computer-readable medium of claim 19, wherein each of the one or more portions comprises one or more of a sentence or a phrase within the text transcript.

* * * * *